No. 852,839. PATENTED MAY 7, 1907.
H. H. HOWELL.
MACHINE FOR MOLDING PLASTIC MATERIAL.
APPLICATION FILED JULY 19, 1906.
3 SHEETS—SHEET 3.
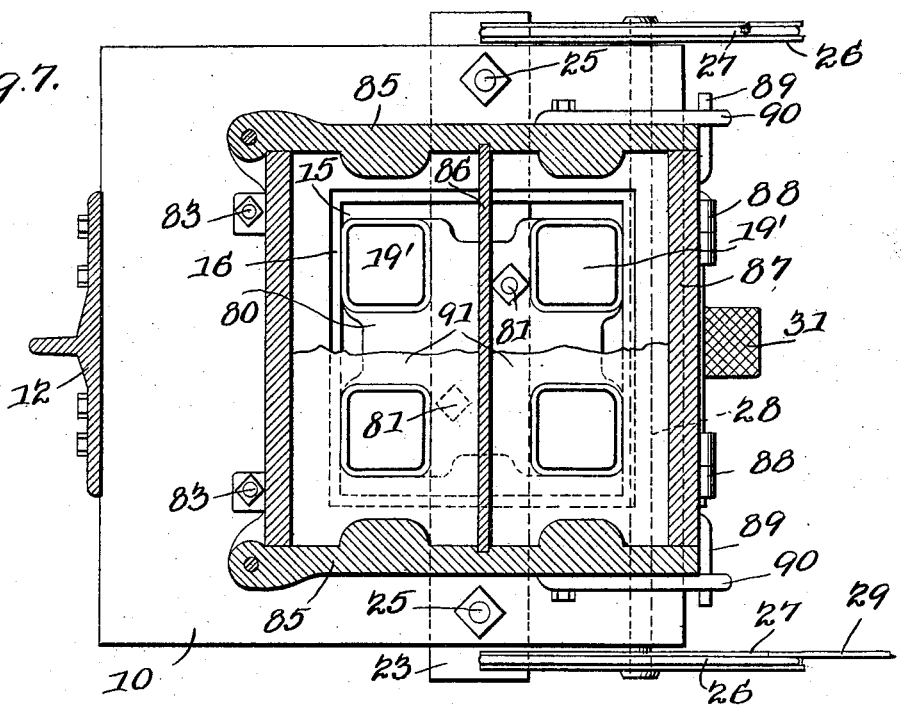
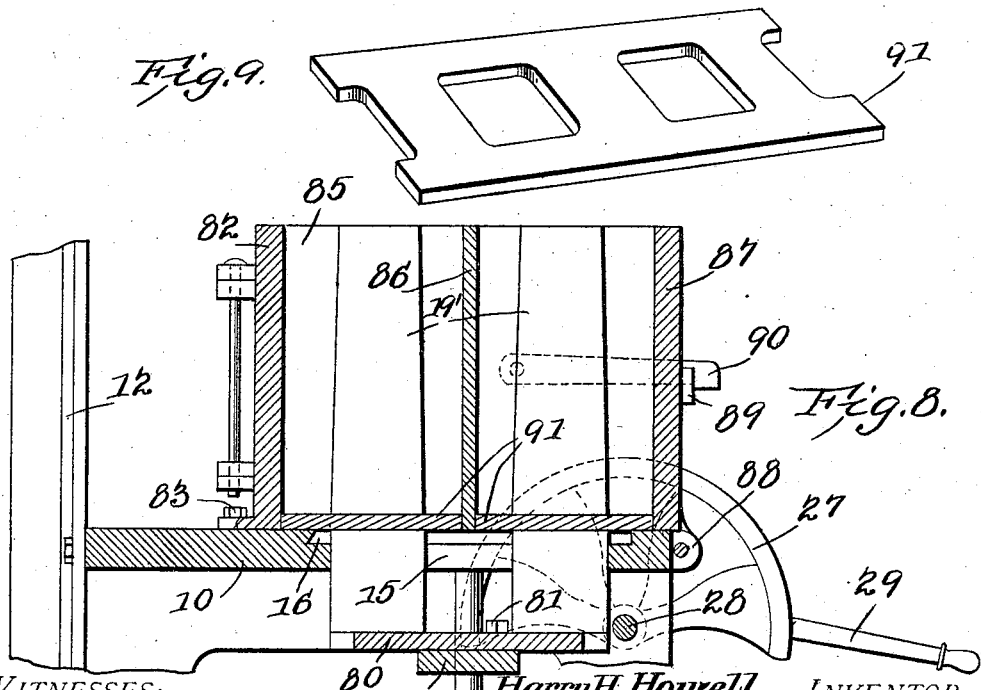
WITNESSES: Harry H. Howell, INVENTOR.
ATTORNEYS

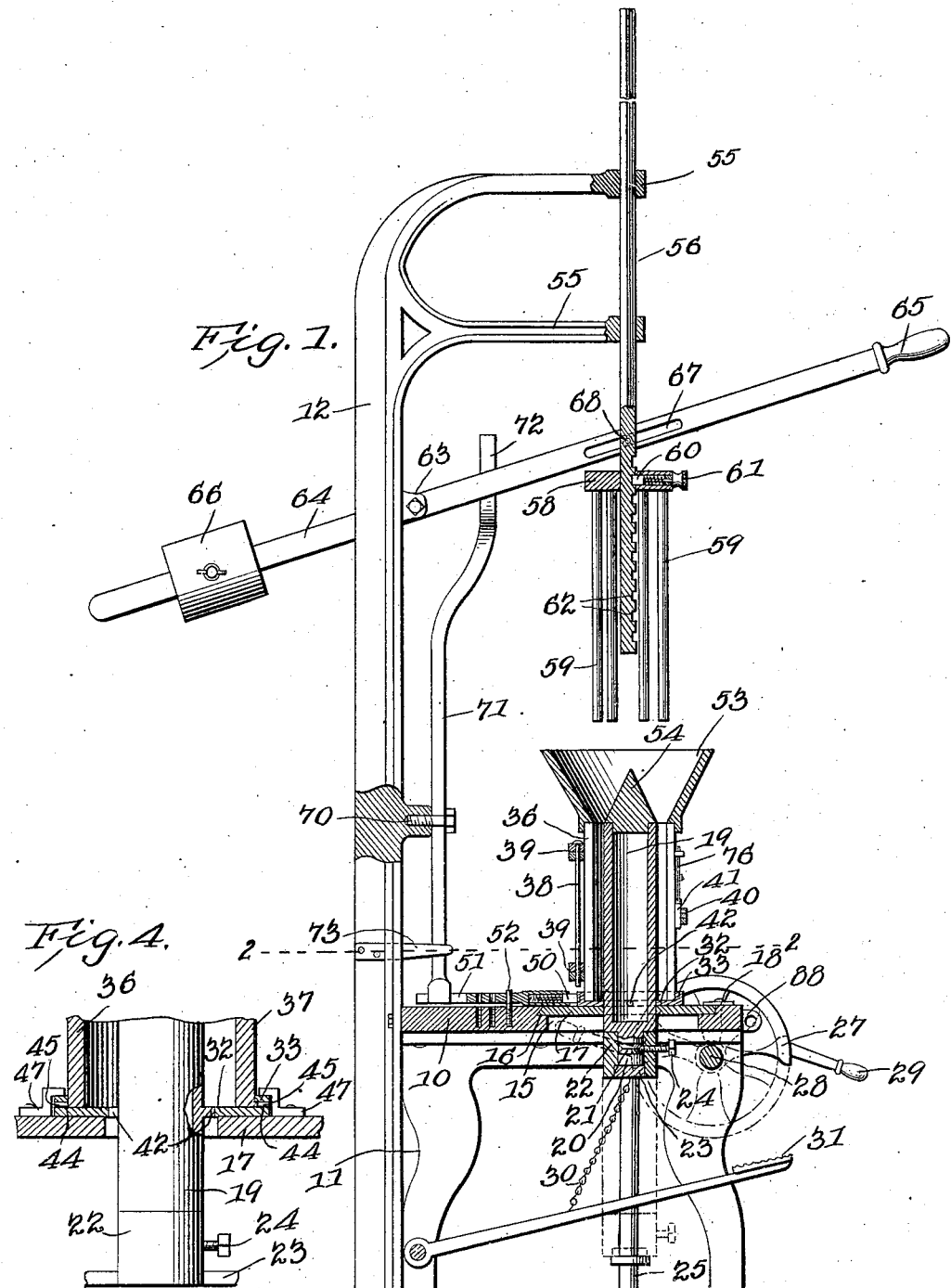

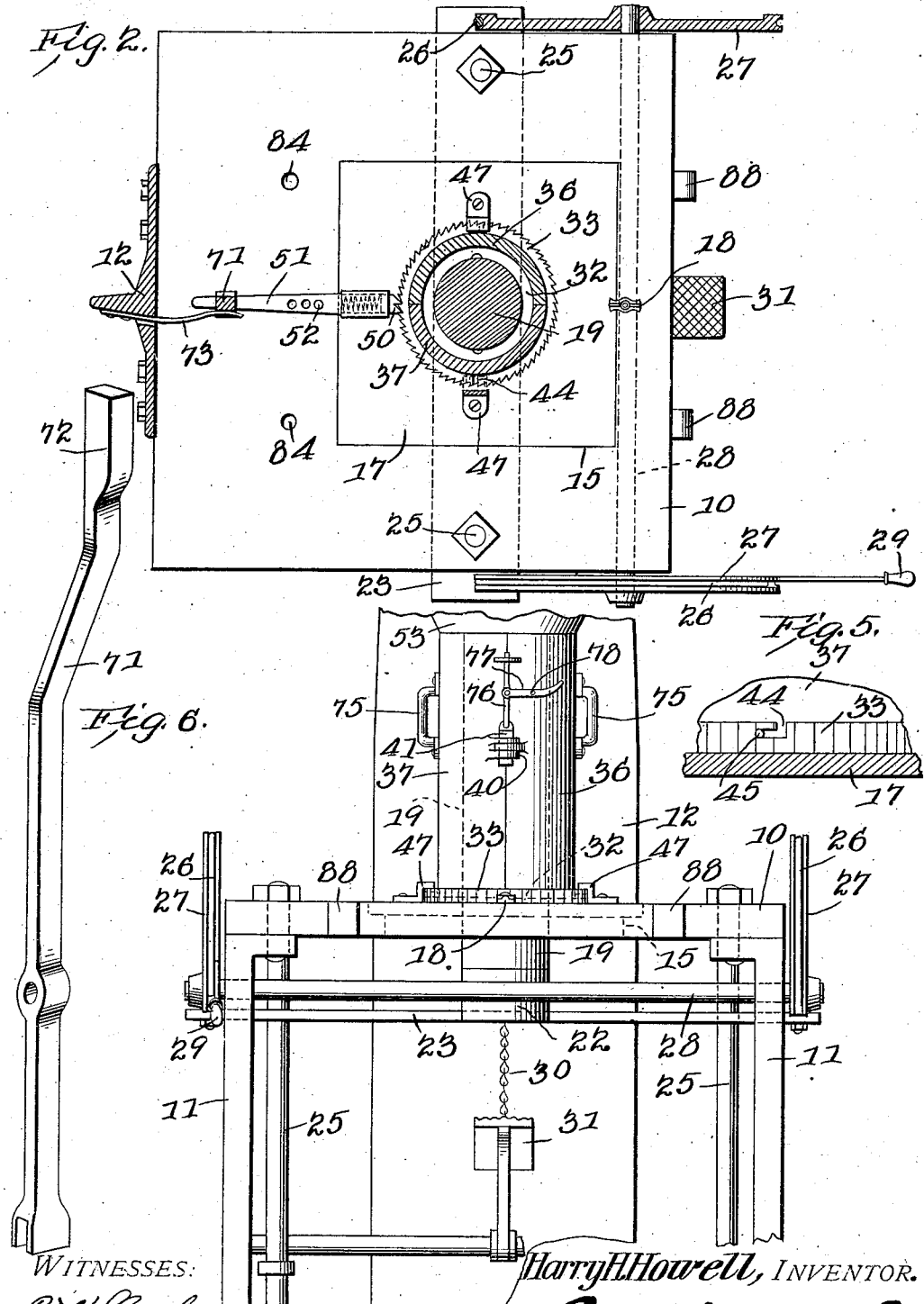

UNITED STATES PATENT OFFICE.

HARRY H. HOWELL, OF HOPE, ARKANSAS, ASSIGNOR OF ONE-FIFTH TO WILLIAM C. WILSON, OF BRICE, OHIO.

MACHINE FOR MOLDING PLASTIC MATERIAL.

No. 852,839.  Specification of Letters Patent.  Patented May 7, 1907.

Application filed July 19, 1906. Serial No. 326,900.

*To all whom it may concern:*

Be it known that I, HARRY H. HOWELL, a citizen of the United States, residing at Hope, in the county of Hempstead and State of Arkansas, have invented a new and useful Machine for Molding Plastic Material, of which the following is a specification.

This invention relates to apparatus for molding concrete and other plastic material into the form of tiles, bricks, blocks, and the like, and has for one of its objects to provide a machine which may be readily adjusted for the formation of molded articles of different type and of different size.

A further object of the invention is to construct a novel form of mold box, so arranged as to permit the removal of the finished tile without danger of injury.

A still further object of the invention is to provide a machine of this type in which the mold box receives circular or oscillatory movement during the tamping operation.

A still further object of the invention is to provide a novel form of tamping mechanism by which the material may be uniformly tamped and solidified.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a vertical section of a machine for molding plastic material constructed in accordance with the invention. Fig. 2 is a sectional plan view of the same on the line 2—2 of Fig. 1. Fig. 3 is a front elevation of the lower portion of the machine. Fig. 4 is a vertical sectional view through the lower portion of the mold box and its support. Fig. 5 is a side elevation showing the connections between the lower portion of the mold box and the ratchet ring. Fig. 6 is a perspective view of the cam lever detached. Fig. 7 is a sectional plan view of the machine adjusted for the manufacture of rectangular blocks. Fig. 8 is a transverse sectional view of the structure shown in Fig. 7. Fig. 9 is a detail perspective view of one of the pallets employed in the manufacture of the rectangular blocks.

Similar numerals of reference are employed to indicate corresponding parts throughout the several figures of the drawings.

The working parts of the machine are supported on a suitable frame which includes a bed plate 10 mounted on suitable legs 11 and a vertical standard 12.

In the central front portion of the table is a rectangular opening 15, around the upper portion of the wall of which extends a continuous groove 16, the wall at the rear portion of the groove being inclined or dovetailed, and this groove receives a detachable plate 17 rectangular in form and having its rear edge beveled to fit against the wall of the groove. The front edge of the plate is held down in place by a suitable turn button or lock 18.

The plate 17 is provided with a guiding opening for the passage of a vertically movable core 19, which when made of metal is preferably hollow in order to decrease the weight. At the lower central portion of the core is a depending pin 20 having an annular groove 21, approximately V-shape in cross section. This pin enters an opening formed in a collar 22 that is supported by a core carrier 23 in the form of a bar arranged horizontally under the table 10, and through the collar extends a screw 24 which enters the groove 21, and prevents displacement of the core without, however, interfering with its free rotative movement during the operation of the machine.

At points near the opposite sides of the machine are vertically disposed guide bars 25 which extend through openings formed in the core carrying bar 23, and hold the same from rotative movement. To the opposite ends of the bar 23 are connected chains or cables 26 which pass around lifting segments 27 that are carried by a horizontally disposed rock shaft 28 having bearings in the frame. One of these segments has an operating handle 29 through which motion may be imparted to both segments for effecting the raising and lowering of the core carrying bar and the core, and to facilitate the downward movement of the core, said core carrying bar is connected by a chain 30 to a pedal 31 so that the weight of the operator may be utilized in starting the downward movement of the core after the completion of the molding operation.

Mounted on the plate 17 and provided with a central opening for the passage of the core 19 is a disk or ring 23 having a continuous marginal flange 33 within which the mold box is seated. The mold box is formed of two approximately semi-cylindrical segments 36 and 37, which are connected together by a hinge pin 38, passing through pivot lugs 39 at one side of the mold box. At the opposite side of the box the adjacent edges of the sections are provided with lugs 40 having openings for the passage of a locking bolt 41 by means of which said sections are held closed during the tamping and other operations.

Projecting from the opposite sides of the core are small pins 42, which enter small notches formed in the disk or ring 32, so that the core may be locked to the ring and rotated therewith. The flange 33 is provided with slots 44 for the reception of pins 45 that project from the opposite sides of the mold box, and when the pins are entered in these slots, the mold box is firmly locked to the disk or ring. The disk or ring is held down to the table, and vertical movement prevented by means of a pair of lugs 47, that are bolted to the plate 17 and extend slightly over the upper edge of the flange.

The periphery of the disk or ring is provided with a continuous annular series of ratchet teeth which are engaged by a spring pressed pawl 50 carried by a lever 51 that is mounted on a fulcrum pin 52 projecting from the bed plate in such manner as to permit the ready removal of the lever when necessary. The rear end of this lever is operated in the manner hereinafter described in order to impart movement to the pawl, and from thence to the ratchet teeth, so that the ring 32 and the core and mold box may receive rotative movement from the tamping operation.

On top of the mold box is placed a hopper 53 which may be removed after the tamping operation, and on top of the core is placed a small conical guide block 54 which may, also, be removed. This guide block serves to direct the concrete or other plastic material into the annular space between the core and the mold box during the manufacture of hollow cylindrical tiles.

The upper portion of the standard 12 is provided with a pair of horizontally disposed brackets or arms 55 that have guiding openings for the reception of a vertically movable tamper carrying bar 56, the bar being preferably square or of other non-circular form in cross section, and the guiding openings being similarly shaped, in order to prevent rotative movement of said bar. Mounted on the lower portion of the bar is a tamper head 58 carrying a number of tamping fingers 59 which are arranged in a continuous annular series, and are designed to enter the annular space between the core and mold box, and pack or tamp the plastic material. The tamping head 58 is provided with a spring pressed locking bolt 60 having a suitable operating knob 61, and this bolt is designed to enter a series of notches 62 that are formed in the lower portion of the bar 56, so that the tamper head may be adjusted to any desired height and may be raised during the progress of the tamping operation as the mold box becomes filled with tamped material.

The frame 12 carries a stud 63 on which is pivoted a lever 64 having at one end an operating handle 65, and being provided at the opposite end with an adjustable counterbalance weight 66. This lever has an elongated slot 67 into which extends an annular friction roller 68 carried by a pin or other support projecting from the bar 56. The weight of the counter-balance 66 is sufficient to normally maintain the tamping device and lever in elevated position, the tamping force being exerted by downward pulls of the handle 65. The frame member 12 also carries a stud or bolt 70 on which is pivoted a pawl actuating cam lever 71. At the upper end of the lever 71 is a cam 72 which is arranged in the path of movement of the lever 64, and each time the latter is raised, movement is imparted to said lever 71. The lower end of the lever 71 is bifurcated and embraces the rear end of the pawl carrying lever 51, so that as the pawl carrying lever is rocked, the mold box and core will receive intermittent rotative movement. The cam 72 is held in contact with the lever 64 by means of a spring 73 that is carried by the standard 12 and engages against one side of said lever. The opposite sides of the mold box are provided with handles 75 for convenience in manipulating the mold box, and in order to permit opening of the box while grasping the handles, the bolt 41 is connected by a link 76 to an operating lever 77, fulcrumed on a stud 78 that projects from one of the sections of the mold. The end of this lever has a thumb piece within convenient reach of the thumb of the operator, while grasping one of the handles.

In the operation of the mechanism as thus far described, the various parts being in the position shown in Fig. 1, the plastic material is filled into the mold or hopper, and then the bolt 60 is withdrawn in order to allow the tamping levers to drop down until they engage with the material. The operator then grasps the handle 65 and starts the tamping operation, and during each movement, the lever 64 engages the cam 72 and movement is transmitted through the cam lever to the pawl carrying lever, and from thence to the disk or ring 22, and the core and mold box, these being rotated at the end of each tamping blow, so that the tamping finger will never strike at precisely the same point on two successive blows. In this way the material may be more uniformly condensed and solidified, and a more perfect tile produced than where the tamping is accomplished by random blows of a hand tamper, or by the pressure of a plate or similar member in a mechanically actuated tamper. As the tamping operation progresses, and the mold box becomes filled, the connection between the tamping handle 58 and the bar 56 may be adjusted, so that there will be no excessive strain, nor any wear between the operating handle and its connection with the bar 56.

After the mold has been filled and tamped, the tamping head is supposed to be in its highest position, and will be held in this position, free from the mold box, by the counter weight 66. The operator then removes the hopper 53 and the core block 54 and trowels off the surplus material to form a smooth finished end on the tile. The weight of the operator is then imposed on the treadle 31 in order to start the downward movement of the core, and the handle 29 is grasped for the purpose of turning the shaft 28 and allowing the core to move down vertically until it is entirely clear of the mold. The operator then grasps the handles of the mold box, and carries the mold and the finished articles to the drying floor, at which point he depresses the lever 77 and moves the bolt 41 to release position, after which the two parts of the mold may be readily opened to free the tile.

When it is desired to employ the apparatus for the manufacture of hollow concrete building blocks, the tamping head is released wholly from the bar 56 and allowed to fall into the mold, after which the core operating lever 51 is raised from its pin 52. The core being depressed, the plate 17, together with the mold box, and flange or ring 32, are entirely removed from the machine. The screw 24 is then loosened and the core removed. A core plate 80 is then connected to the top of the core carrying bar 23 by means of bolts 81, this core carrying plate being shown in the present instance as provided with a plurality of cores 19', and these are arranged to move up through the opening 15 in the bed plate. A back plate 82 is then secured to the base by bolts 83, which pass through openings 84 formed in the bed plate for that purpose. To this back plate are hinged the end plates 85, the latter being preferably of such size as to permit the manufacture of two blocks, and the two blocks are divided by a partition 86, the ends of which fit within vertical grooves formed in the inner faces of the end plates. The front plate 87 is hinged to lugs 88 that are carried by the frame, and the front plate is provided with projecting arms or lugs 89 which are arranged to be engaged by locking latches 90 pivoted to said end plates.

The pallets 91 are of a shape corresponding to the contour of the block to be made, and are provided with the usual core receiving openings. After the pallets have been placed in position, the cores are elevated and the mold box is closed and locked, after which the material is filled in and tamped by hand or otherwise, and the surplus material is troweled off. The operator then withdraws the cores by the same mechanism as that previously described, and after opening the mold box, removes first the front block on its pallet, then the division plate, and then the rear block. New pallets are then placed in position and the mold box again closed and locked.

It is obvious that in some cases the mold box may receive a simple oscillatory movement, instead of a complete rotative movement, and that the operation of the tamping mechanism will be substantially the same as though the mold box received intermittent rotative movement in one direction.

I claim:—

1. The combination with a mold box, of a reciprocatory tamping member, a manually operable actuating lever therefor, the lever having a variable stroke governed by the quantity of material in the mold box, and the force of the tamping blow, and means actuated by said lever for imparting to the mold box a step by step rotative movement proportioned to the stroke of the lever.

2. In combination, a mold box, a tamping member, a carrying rod to which said tamping member is adjustably connected, an operating lever connected to the rod, a cam lever receiving movement from the rod operating lever, a ratchet wheel secured to the mold box, and a pawl engaging the ratchet wheel and receiving movement from said cam lever.

3. In combination, a mold box having a projecting lug, a flanged supporting ring having a notch or slot for the reception of the lug, ratchet teeth on said ring, a pawl engaging the ratchet teeth, a tamping device, and means for transmitting movement from the tamping device to the pawl.

4. In combination, a mold box having a projecting lug, a flanged supporting ring having a slot for the reception of the lug, ratchet teeth on the ring, a pawl engaging the ratchet teeth, a pawl carrying lever, a tamping member, an operating lever therefor, and a cam lever extending between the tamping lever and the pawl carrying lever.

5. In combination, a mold box having a projecting lug, a flanged supporting ring having a slot for the reception of said lug, ratchet teeth on the ring, a pawl engaging the ratchet teeth, a pawl carrying lever, a reciprocatory tamping member, a counterbalanced operating lever therefor, and a cam lever connected to the pawl carrying lever and having a cam in the path of movement of the tamping member.

6. In a machine of the class described, a revoluble ring, means for rotating the same, a vertically movable core extending through said ring, a mold box carried by the ring, means for locking the core and mold box to the ring.

7. In combination, a flanged ring forming the base of the mold box, means for rotating the ring, a core movable vertically through said ring, means for locking the same to the ring, a sectional mold box seated within the flange and provided with a pair of projecting lugs, and the flange having slots for the reception of said lugs.

8. In combination, a table having an opening for the passage of a core, a mold box supported on the table, a core carrying bar, a core mounted thereon, means for guiding the bar, a pedal connected to the bar, a shaft, means for supporting the same, a pair of lifting segments carried by the shaft, and flexible connections between said segments and the bar.

9. In a machine of the class described, a frame including a table, said table having an opening, a detachable plate for covering the opening, interchangeable mold boxes, a core carrying bar arranged beneath the table, interchangeable cores, means for connecting the same to the bar, a pair of guide rods for said bar, lifting segments, and flexible connections between the segments and the bar.

10. The combination with a mold box, of a vertically guided rod having a plurality of notches, a tamper head, a locking bolt carried thereby, and adapted to said notches, tamping members depending from said head, and means for operating said bar.

In testimony that I claim the foregoing as my own, I have hereto affixed my signature in the presence of two witnesses:

HARRY H. HOWELL.

Witnesses:
  W. P. AGEE,
  JOE D. BOWDEN.